US007633387B2

(12) United States Patent
Carmichael et al.

(10) Patent No.: US 7,633,387 B2
(45) Date of Patent: Dec. 15, 2009

(54) METHOD FOR TRACKING PERSONNEL AND EQUIPMENT IN CHAOTIC ENVIRONMENTS

(75) Inventors: Dennis Conrad Carmichael, Ann Arbor, MI (US); John Clemens Ellis, Chesterfield Township, MI (US)

(73) Assignee: ERT Systems, LLC, Ann Arbor, MI (US)

( * ) Notice: Subject to any disclaimer, the term of this patent is extended or adjusted under 35 U.S.C. 154(b) by 332 days.

(21) Appl. No.: 11/563,955

(22) Filed: Nov. 28, 2006

(65) Prior Publication Data

US 2007/0120671 A1 May 31, 2007

Related U.S. Application Data

(60) Provisional application No. 60/740,475, filed on Nov. 29, 2005.

(51) Int. Cl.

*G08B 1/00* (2006.01)
*G01S 1/00* (2006.01)
*G01S 5/00* (2006.01)
*G01S 5/14* (2006.01)
*G01C 21/00* (2006.01)
*G08B 13/14* (2006.01)
*G08B 5/22* (2006.01)

(52) U.S. Cl. ........................... 340/539.13; 342/357.06; 342/357.07; 342/357.08; 342/357.09; 342/357.13; 701/213; 701/216; 340/572.1; 340/825.49

(58) Field of Classification Search ............ 340/539.13, 340/825.49

See application file for complete search history.

(56) References Cited

U.S. PATENT DOCUMENTS 5,552,772 A 9/1996 Janky et al.
5,596,652 A 1/1997 Piatek et al.
5,661,492 A 8/1997 Shoap et al.
5,793,882 A 8/1998 Piatek et al.
5,999,131 A 12/1999 Sullivan
6,029,889 A 2/2000 Whalen, Jr. et al.
6,133,876 A 10/2000 Fullerton et al.
6,300,903 B1 10/2001 Richards et al.
6,307,475 B1 10/2001 Kelley
6,501,393 B1 12/2002 Richards et al.
6,512,455 B2 1/2003 Finn et al.

(Continued)

*Primary Examiner*—Daniel Wu
*Assistant Examiner*—Jack Wang
(74) *Attorney, Agent, or Firm*—Dickinson Wright PLLC

(57) ABSTRACT

A method for automatically calibrating and deploying a tracking system of the type used by emergency responders (10) at the scene of a chaotic event such as a fire or the like. Each firefighter (10) is issued a wireless tag (26) having a unique identification number. Personal details about the firefighter (10) are prerecorded in a central database (44). Every piece of equipment (12, 14, 16) is also issued a wireless tag (26), with details about that piece of equipment prerecorded in the central database (44). At the scene of an emergency, drop readers (30, 30') are scattered about the area. The drop readers (30, 30') sense the location and ID number of each wireless tag (26). The drop readers (30, 30') communicate with the central database (44) via a wireless connection (46). A scene commander (18) interfaces with the central database (44) through a graphic user interface (48) to acquire real time information about the location and movement of all personnel and equipment at the response scene. The reported data may be superimposed over a map of the scene, and exported in the form of reports (52).

10 Claims, 6 Drawing Sheets

U.S. PATENT DOCUMENTS

| | | | | |
|---|---|---|---|---|
| 6,762,721 | B2 | 7/2004 | Halsey et al. | |
| 6,824,065 | B2 | 11/2004 | Boone et al. | |
| 6,853,303 | B2 | 2/2005 | Chen et al. | |
| 6,894,612 | B2 | 5/2005 | Xydis | |
| 6,909,367 | B1 | 6/2005 | Wetmore | |
| 6,930,607 | B2 | 8/2005 | Kiel et al. | |
| 6,952,574 | B2 | 10/2005 | Tealdi et al. | |
| 6,965,344 | B1 | 11/2005 | Halsey et al. | |
| 6,970,097 | B2 | 11/2005 | Welles, II et al. | |
| 7,005,980 | B1 * | 2/2006 | Schmidt et al. | 340/539.13 |
| 7,034,678 | B2 | 4/2006 | Burkely et al. | |
| 7,064,660 | B2 | 6/2006 | Perkins et al. | |
| 7,091,851 | B2 | 8/2006 | Mason et al. | |
| 7,091,852 | B2 | 8/2006 | Mason et al. | |
| 7,110,777 | B2 | 9/2006 | Duncan | |
| 7,126,471 | B2 | 10/2006 | Ahmed et al. | |
| 2001/0036832 | A1 | 11/2001 | McKay | |
| 2003/0144011 | A1 | 7/2003 | Richards et al. | |
| 2003/0152061 | A1 | 8/2003 | Halsey et al. | |
| 2004/0021569 | A1 | 2/2004 | Lepkofker et al. | |
| 2005/0124315 | A1 * | 6/2005 | Kageyama et al. | 455/403 |
| 2005/0165616 | A1 | 7/2005 | Ellis et al. | |
| 2005/0237193 | A1 | 10/2005 | Namm et al. | |
| 2005/0245232 | A1 | 11/2005 | Jakober et al. | |
| 2005/0270158 | A1 | 12/2005 | Corbett, Jr. | |
| 2006/0029010 | A1 | 2/2006 | Belcea | |
| 2006/0132300 | A1 | 6/2006 | Howe, Jr. et al. | |
| 2006/0144940 | A1 * | 7/2006 | Shannon et al. | 235/385 |
| 2006/0158329 | A1 | 7/2006 | Burkley et al. | |
| 2006/0187028 | A1 | 8/2006 | Kiang et al. | |
| 2006/0193262 | A1 * | 8/2006 | McSheffrey et al. | 370/241 |
| 2006/0211404 | A1 * | 9/2006 | Cromp et al. | 455/405 |
| 2006/0220837 | A1 | 10/2006 | Kozlay | |
| 2006/0238610 | A1 | 10/2006 | Teesdale | |
| 2008/0129591 | A1 * | 6/2008 | Lamance et al. | 342/357.12 |

* cited by examiner

METHOD FOR TRACKING PERSONNEL AND EQUIPMENT IN CHAOTIC ENVIRONMENTS

CROSS REFERENCE TO RELATED APPLICATIONS

The present application claims priority to U.S. provisional application entitled Portable or Wearable System for Tracking Personnel and Equipment in Chaotic Environments having Ser. No. 60/740,475 and filed on Nov. 29, 2005.

BACKGROUND OF THE INVENTION

1. Field of the Invention

The subject invention relates to a method for operating and deploying a resource tracking system of the type used by emergency responders at the scene of a chaotic event such as a fire or the like.

2. Related Art

Certain situations, such as emergencies and emergency drills or exercises, create chaotic environments where it can be difficult to track and locate personnel and equipment. For example, if a building is evacuated, the security manager must know whether all of the workers inside the building have left and where they are presently located. For another example, an incident commander is placed in charge at a large fire with multiple fire departments responding. The incident commander must know at all times what personnel and equipment are on site. In yet another example, it may be necessary to track the exposure of people and objects to toxic contaminants.

Emergency events usually happen at unknown and unplanned locations. There is no opportunity to set up equipment ahead of time. Under chaotic conditions, quick response time and data collection accuracy are critical tools. The scene or incident commander is in need of a portable, rapidly deployable system which can help capture and provide tracking information for response personnel and equipment with little or no set up effort.

The prior art has proposed various systems for locating tagged personnel and equipment at the scene of an event. Generally, tags or other transmitting devices are carried by the personnel or affixed to the equipment and transmit a signal that is received by one or more readers erected about the perimeter of a scene. These tags or other transmitting devices are generally of two styles. In one style, the tag determines its own location usually based on a feed from a navigational satellite such as GPS. The tag then transmits its known location to the reader, which acts as a relay passing the tag location on to a scene commander equipped with a graphical user interface so that the position of all of the tags, and hence the associated resources, can be monitored. Tags of this first type are expensive devices and are useful only so long as their ability to self-determine location is properly functioning. If the tag moves into an area where its ability to communicate with the navigational satellite is interrupted, the functionality of the tracking system is compromised.

A second type of tag, much less expensive than the first type described above, transmits only an identification number and perhaps other basic information. The second type of tag does not have the capability, or does not rely on the ability, to self determine and transmit data corresponding to its location. Rather, these systems rely upon a calibrated array of strategically arranged readers which sense and triangulate the position of the tags, and then relay this calculated position back to the scene commander. While the use of these second type, low cost tags is generally preferred, this method of tracking personnel and equipment is disadvantageous because the readers must be carefully set up and calibrated prior to use. Such calibration may require skilled technical people placing the readers at precise locations about the scene of the chaotic event. Not only does this calibration step consume much valuable time, but also is not adaptable to the scene of a chaotic event because the scene can actually shift during its course. Take for example a fire, which migrates from one building to the next.

Another drawback of prior art systems arise out of the inaccurate calculation of tag locations. As can be imagined, obstructions present in the chaotic scene, such as heavy concrete walls, thick metallic features, and the like can affect the signal strength of wireless radio signals passing therethrough. Likewise, electromagnetic reflective surfaces can affect the vector of radio signals emitted by the wireless tags. These and other related factors can render false tag location calculations by the tracking system software. As a result, a scene commander relying upon the calculated position of sensed tags within the scene may draw inaccurate conclusions because the actual position of a sensed tag is not properly understood.

And yet another drawback found in prior art systems arises out of the general inability to determine whether a tag is actually being tracked by the system at any given moment. Because such tags can be damaged through use, and also because the sensing range is usually limited, there exists a need to determine whether a tag being used by an emergency responder, at any given moment, is currently recognized by the tracking system.

SUMMARY OF THE INVENTION

The subject invention overcomes the shortcomings and disadvantages found in prior art systems by providing a method for automatically calibrating a tracking system of the type used by emergency responders at the scene of a chaotic event, such as a fire or the like. The method comprises the steps of affixing a wireless tag to each of a plurality of emergency resources, each tag configured to broadcast a unique ID number via wireless signal. The method includes dispersing the resources together with their affixed tags about the scene of a chaotic event over a generally defined area. The method also includes placing a first drop reader device within the generally defined area of the scene, assigning the first drop reader an absolute position relative to the scene from a reference input external to the tracking system, and receiving in the first drop reader at least one ID number from a sensed first one of the tags. The orientation of the sensed first tag is determined relative to the first drop reader, and then the absolute position of the sensed first tag is calculated relative to the scene by its relationship with the assigned absolute position of the first drop reader. The method goes on to include the step of placing a second drop reader device within the generally defined area of the scene and spaced from the first drop reader, receiving in the second drop reader at least one ID number from a sensed second one of the tags, and orienting the sensed second tag relative to the second drop reader. The improvement comprises orienting the second drop reader relative to the first drop reader and then determining the absolute position of the second sensed tag relative to the scene by its sequenced relationship with the assigned absolute position of the first drop reader.

Thus, the subject method for automatically calibrating a tracking system requires only one of two or more drop readers to be located on the scene by reference to an external input. The second and any additional drop reader devices can be calibrated based on their relative position to the first drop reader. This feature enables the quick and relatively unsophisticated deployment of drop readers about the scene, as well as the relocation of drop readers, if needed, as the scene migrates during the course of a chaotic event.

According to a second aspect of this invention, a method is provided for deploying a tracking system of the type used by emergency responders at the scene of a chaotic event such as a fire or the like. The method comprises the steps of affixing a wireless tag to each of a plurality of emergency resources, each tag configured to broadcast a unique ID number via wireless signal. The method includes dispersing the resources together with their affixed tags about the scene of a chaotic event occurring over a generally defined area, placing at least one drop reader device within the generally defined area of the scene, determining an absolute position of the drop reader relative to the scene, receiving in the drop reader at least one ID number from a sensed one of the tags, orientating the sensed tag relative to the drop reader, calculating the absolute position of the sensed tag relative to the scene by its relationship with the absolute position of the drop reader, and repeating at regular intervals the step of calculating the absolute position of the sensed tag to monitor movement of the tag over time. The improvement comprises the step of comparing the change in position of the sensed tag over time to at least one predetermined physical constraint, and then automatically adjusting the calculated absolute position of the sensed tag relative to the scene when the predetermined physical constraint is violated.

According to this aspect of the invention, the tracking system is able to determine and/or infer real time location of tags even amongst false signal receptions caused by obstructions and reflective surfaces affecting signal strength and vectors emitted by the tags. A scene commander is thereby provided with more reliable, real time information concerning the location of emergency resources.

According to yet another aspect of this invention, a method is provided for tracking emergency responders at the scene of a chaotic event such as a fire or the like. The method comprises the steps of affixing a wireless tag to each of a plurality of emergency resources, each tag configured to broadcast a unique ID number via wireless signal over a limited range, dispersing the resources together with their affixed tags about the scene of a chaotic event occurring over a generally defined area, placing at least one drop reader device within a generally defined area of the scene, receiving in the drop reader at least one ID number from a sensed one of the tags, orienting the sensed tag relative to the drop reader, repeating at regular intervals the step of orienting the sensed tag to monitor movement of the tag over time, and affixing a light source directly to the tag. The improvement comprises illuminating the light source in response to the tag moving either into or out of the limited range of the wireless signal.

According to this latter aspect of the invention, it is possible to visually determine whether any given tag is being tracked by the system. If it is determined that a tag is not being tracked by the system, corrective measures can be pursued.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
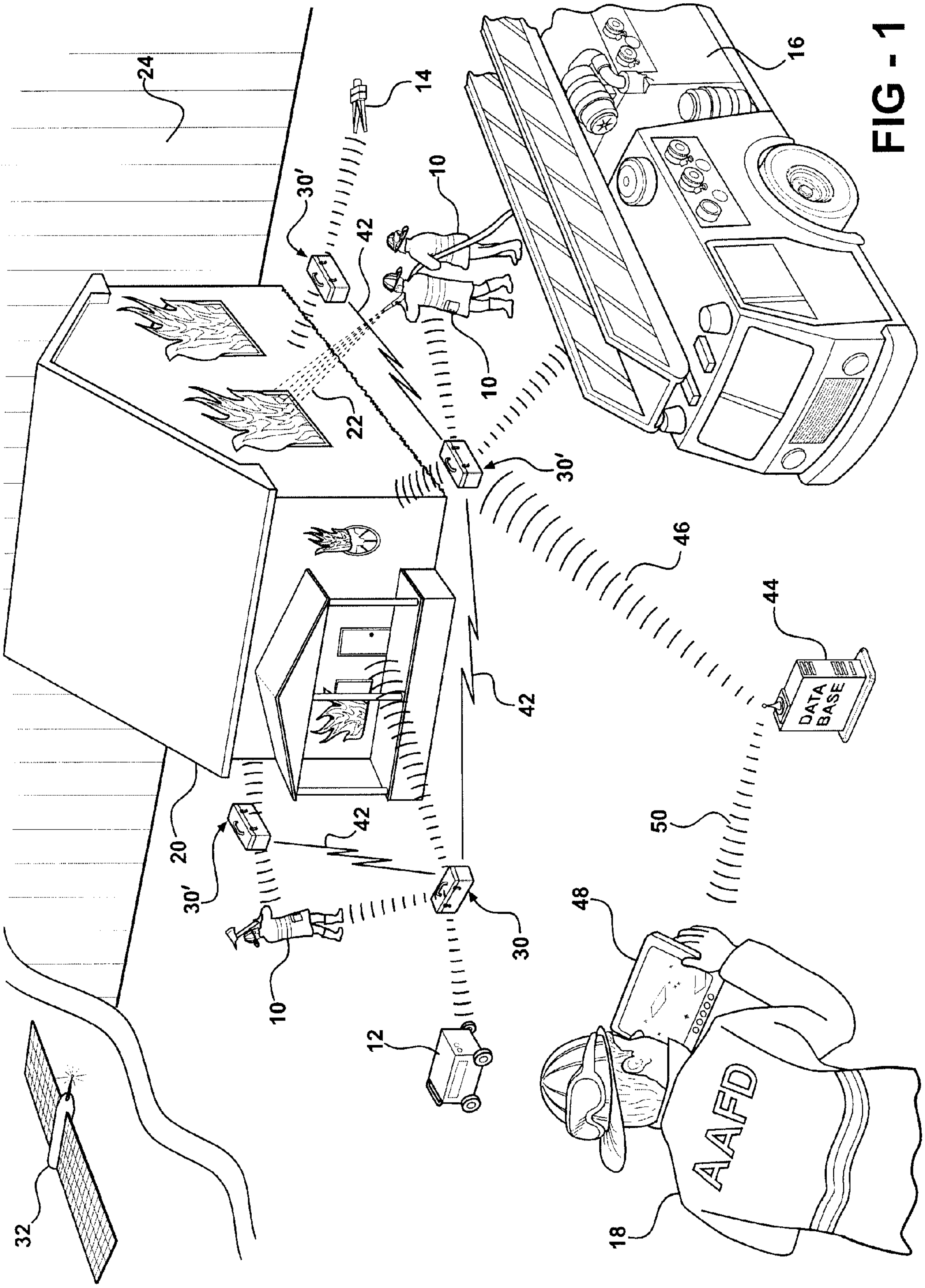
FIG. 1 is a simplified illustration depicting a plurality of emergency resources dispersed about the scene of a chaotic event.

Referring to the Figures, wherein like numerals indicate like or corresponding parts throughout the several views, an exemplary chaotic event is graphically illustrated in FIG. 1. In this example, the chaotic event takes the form of a burning building to which firefighters have been dispatched. However, as suggested previously, the chaotic event can take many different forms and types, and is not limited to firefighting. As additional examples, chaotic events may include formal military initiatives, building evacuations, contamination spills, police interventions, and other unplanned events. The example of a fire is used throughout the remainder of the description as merely illustrative of a chaotic event in which emergency responders are dispatched to the scene.

In FIG. 1, a plurality of emergency response resources are deployed to the scene of the chaotic event, which event occurs over a generally defined area. The emergency resources include personnel, depicted here as firefighters 10, as well as equipment which may take the form of a generator 12, rescue tools 14 or a fire truck 16. Of course, these are but representative examples. An incident or scene commander 18 represents the person or persons responsible for managing the deployed resources, both personnel and equipment, at the scene of the chaotic event.

A building 20 is shown ablaze, with one of the firefighters 10 directing a stream of water 22 into the flames. As is often the case, the scene of the emergency response may not be accessible from all sides. In this illustration, the building 20 is shown backed by another structure 24 which prevents access to the rear side of the building 20. As can be appreciated, in some situations only one or two sides of the building 20 may be accessible to the emergency responders. In this example, three sides of the building 20 are accessible to the firefighters 10.

Figure 3:
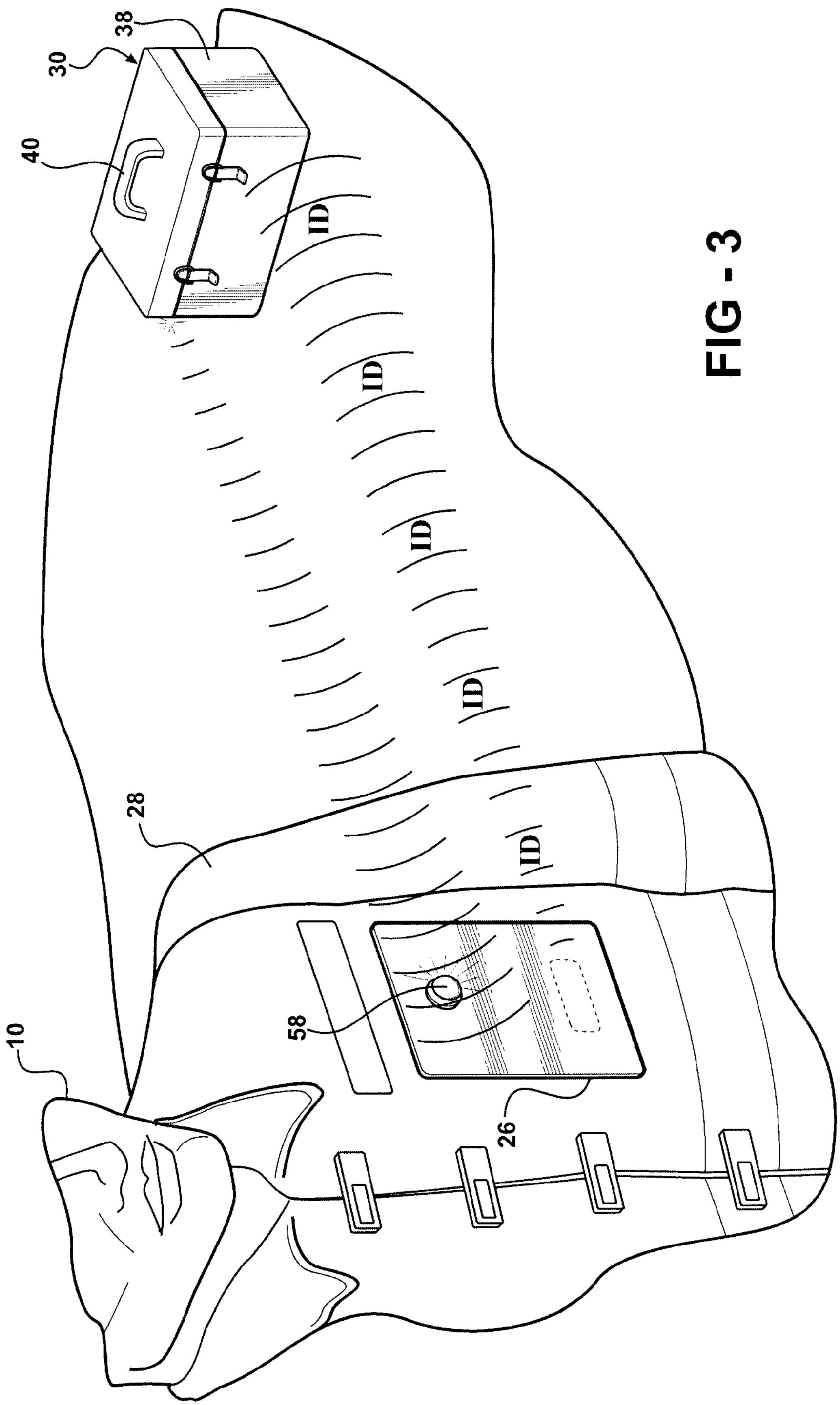
FIG. 3 is an illustrative view of one example of a wireless tag according to the subject invention affixed to a jacket and including a light source which is illuminated in response to the tag moving either into or out of signal range.

The invention here provides a method for automatically calibrating a tracking system of the type used by emergency responders at the scene at a chaotic event regardless of how many sides of the building 20 can be accessed. The tracking system allows the scene commander 18 or other responsible person to manage the deployment of resources 10, 12, 14, 16 at the chaotic event. This systems is implemented by proactively affixing a wireless tag 26 to each of the plurality of emergency resources 10-16. Ideally, the tags 26 are affixed well in advance of the chaotic event. The wireless tags 26 are perhaps best illustrated in FIG. 3, as comprising some small, durable device that can be attached to a jacket 28, or other article of clothing carried by a firefighter 10. The tag 26 is equally conveniently affixed to equipment, such as the generator 12, the rescue tools 14 and the fire truck 16. Indeed, every piece of equipment which is expedient for the scene commander 18 to track, is affixed with a tag 26.

The tags 26 can be of any conventional type configured to broadcast a unique ID number via a wireless signal, including but not limited to RFID types. Such tags have been proposed in numerous forms, including both passive and active devices, any of which can be implemented within the context of this invention. Passive devices are those which react to an incoming electromagnetic signal, whereas active systems usually contain an internal energy source and actively broadcast to an external reader. In addition to the unique identification number broadcast by each tag 26, it is possible for the tag 26 to communicate information which may be specific to the person or piece of equipment to which it is attached, or may comprise sensed data such as the ambient temperature, ambient oxygen level, time of day, etc.

The subject method for automatically calibrating a tracking system here includes placing a first drop reader device, generally indicated at 30, somewhere within the generally defined area of the response scene. The firefighters 10 may simply hand-carry the drop reader 30 to any appropriate location at the scene. This may comprise setting the drop reader on a stable surface, throwing atop a roof, hanging it from a tree, or any other location which the firefighter 10 may determine advantageous. Once the first drop reader 30 has been placed, it is assigned an absolute position relative to the scene from a reference input external to the tracking system. Thus, the geographic location of the first drop reader 30 is provided so that it can be identified on a map of the scene. This assigning of an absolute position preferably comes by way of a signal transmitted from multiple navigational satellites 32. Such navigational satellites 32 are commonly known as GPS or global positioning systems. Through the method of triangulation, the GPS satellite 32 tells the first drop reader 30 where it is absolutely positioned relative to the geographic area of the scene. If the first drop reader 30 is unable to receive a signal from a GPS satellite 32, its absolute position can be assigned manually by the scene commander 18 or an appropriate technician. Thus, if the first drop reader 30 does not have a reliable GPS satellite 32 feed, the scene commander 18 can, either by estimation or by precise knowledge, assign the first drop reader 30 an absolute position relative to the scene. This is an important step so that the tracking system is able to relate the location of sensed tags 26 in a graphically accurate manner.

Figure 2:
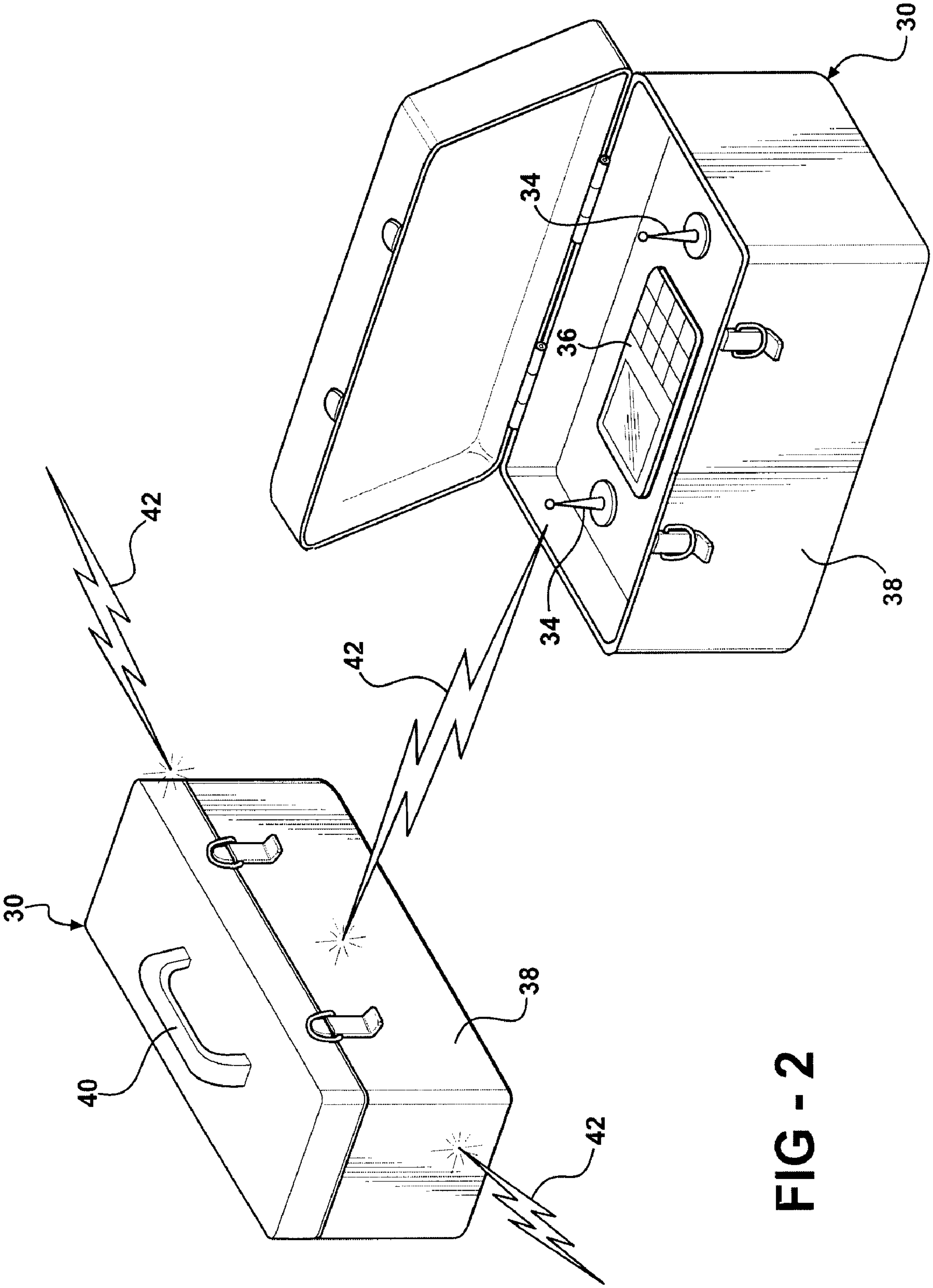
FIG. 2 is a simplified perspective view depicting two drop readers according to the subject invention, one drop reader shown enclosed in a protective box-like case, and the other drop reader shown with the case partially broken away and its hinged lid open to expose directional antenna and a control interface.

Examples of the first drop reader 30 are depicted in FIG. 2 as portable, rugged, rapidly-deployable units including an internal power source such as a battery or fuel cell. The drop reader 30 is fitted with one or more antenna 34 which may be of the directional type. The antenna 34 are capable of receiving wireless signals broadcasting the unique ID numbers from the wireless tags 26, together with any additional information which may be transmitted by the tags 26. This may comprise an auto-ID reader of the RFID type, but other wireless configurations are also possible. Furthermore, the drop reader 30 includes a self-contained control module, such as a portable computer, having some form of user interface 36. Although a rather sophisticated graphical user interface 36 is depicted in the drawings, it is also sufficient to equip the drop reader 30 with a simple LED arrangement to indicate activity and status.

The first drop reader 30 functions as a wireless network transmitter/receiver, which may operate on a cellular modem platform, or on an 802.11g wireless hub configuration, or other suitable methodology. Status indicators such as LED lights may also be incorporated to indicate status and functionality. Additionally, the drop reader 30 may be fitted with sensors including, but not limited to, attitude/orientation, temperature, oxygen, and so on. A software program running on the control module collects data from all of the attached sensors and readers, and establishes a link to other drop readers and/or other available networks via wireless networking. All of these components are encased in a protective, box-like case 38. The case 38 is extremely rugged, weatherproof, heat resistant, lightweight, and includes a carrying handle 40. The box-like construction of the case 38 enables many drop readers to be conveniently stacked for storage in the fire truck 16, and then deployed with the ease of a handled tool box.

The unique ID number broadcast by each tag 26 is received in the first drop reader 30 where the contained software also orients the tag 26 relative to the drop reader 30. In other words, using directional antenna 34 and possibly other indicia such as signal strength, the first drop reader 30 determines where the sensed tag 26 is located relative to its own position. Then, a calculation is made to determine the absolute solution of the sensed tag 26 relative to the scene by its relationship with the assigned absolute position of the first drop reader 30. Said another way, because the absolute position of the first drop reader 30 is known, e.g., via the GPS satellite 32, and because the distance and direction of the tag 26 relative to the first drop reader 30 is determined, a rather simple mathematical calculation can be made to determine with a fair degree of accuracy the absolute position of the sensed tag 26 on a map of the scene. By this quasi polar coordinate method, all tags 26 deployed about the scene that are in sensing range of the first drop reader 30 can be located in absolute terms relative to a map of the scene.

A problem arises, however, in that the tags 26 and/or drop reader 30 have a limited broadcast/sensing range. The scene of the chaotic event may be much larger and more widespread than the limited ranges of the wireless signals. Additional factors may include large obstructions in the scene, like thick concrete or metallic walls, earthen embankments, buildings or the like. Further, certain types of reflective surfaces may cause the electromagnetic wireless signals to bounce and reflect in unpredictable ways. For all of these reasons, the first drop reader 30 may be inadequate to receive the transmitted ID numbers from all of the tags 26 deployed about the scene.

The method of this invention also includes the step of placing a second drop reader 30' within the generally defined area of the scene, and spaced apart from the first drop reader 30. As shown in FIG. 1, three of the second drop readers 30' are shown. However, in actual practice, more or less than three second drop readers 30' may be deployed. The second drop readers 30' are identical in every respect to the first drop reader 30. The only distinction between the first drop reader 30 and the second drop readers 30' is that the first drop reader 30 is assigned an absolute position relative to the scene from the GPS satellite 32 or by the scene commander 18. In the example of FIG. 1, only the first drop reader 30 includes a clear feed from the GPS satellite 32, and therefore is the only drop reader whose absolute position is assigned. In this example, the second drop readers 30' are unable to accurately determine their absolute position from a navigational satellite 32. As a result, they are demoted to a second drop reader 30' instead of a first drop reader 30, and orient themselves via wireless signal 42 relative to the first drop reader 30. Thus, so long as one drop reader 30 is able to accurately determine its position relative to the GPS satellite 32, or otherwise assigned from the scene commander 18, all of the remaining second drop readers 30' orient themselves by wireless communication 42 and calculation back to the first drop reader 30.

Preferably, enough drop readers 30, 30' are scattered about the scene so that their combined sensing ranges are able to receive ID numbers from all of the deployed tags 26. Functioning exactly like the first drop reader 30 described above, the second drop readers 30' also orient the sensed tags 26 relative to themselves using triangulation, vector direction plus signal strength, or other techniques. If a single tag 26 can be sensed by more than one drop reader 30, 30' at the same time, its location relative to the scene can be determined with even greater precision using triangulation techniques built into the system software.

A central database 44 contains pre-recorded specifying information for each unique ID number associated with the tags 26. The specifying information includes details about the person or piece of equipment to which each tag 26 has been assigned. In the example of a firefighter 10, details of his or her name, unit/station, skill level, special training, etc. will be recorded in the database 44 together with the ID number of the tag 26 assigned to them. In the case of equipment, details about that tool are also recorded in the database 44. These details are all associated with the ID number of their respective affixed tag 26. A wireless connection 46 is established between at least one, but preferably several of the drop readers 30, 30' for transmitting the information collected by the drop readers 30, 30'. Although illustratively depicted in FIG. 1 as a direct link, the wireless communication 46 can be relayed through signal towers, a cell phone connection, the internet, or any other appropriate means. By this technique, it is not necessary that the database 44 be physically present at the scene of the chaotic event. Rather, the database 44 may reside in a secure, remote location.

Figure 4:
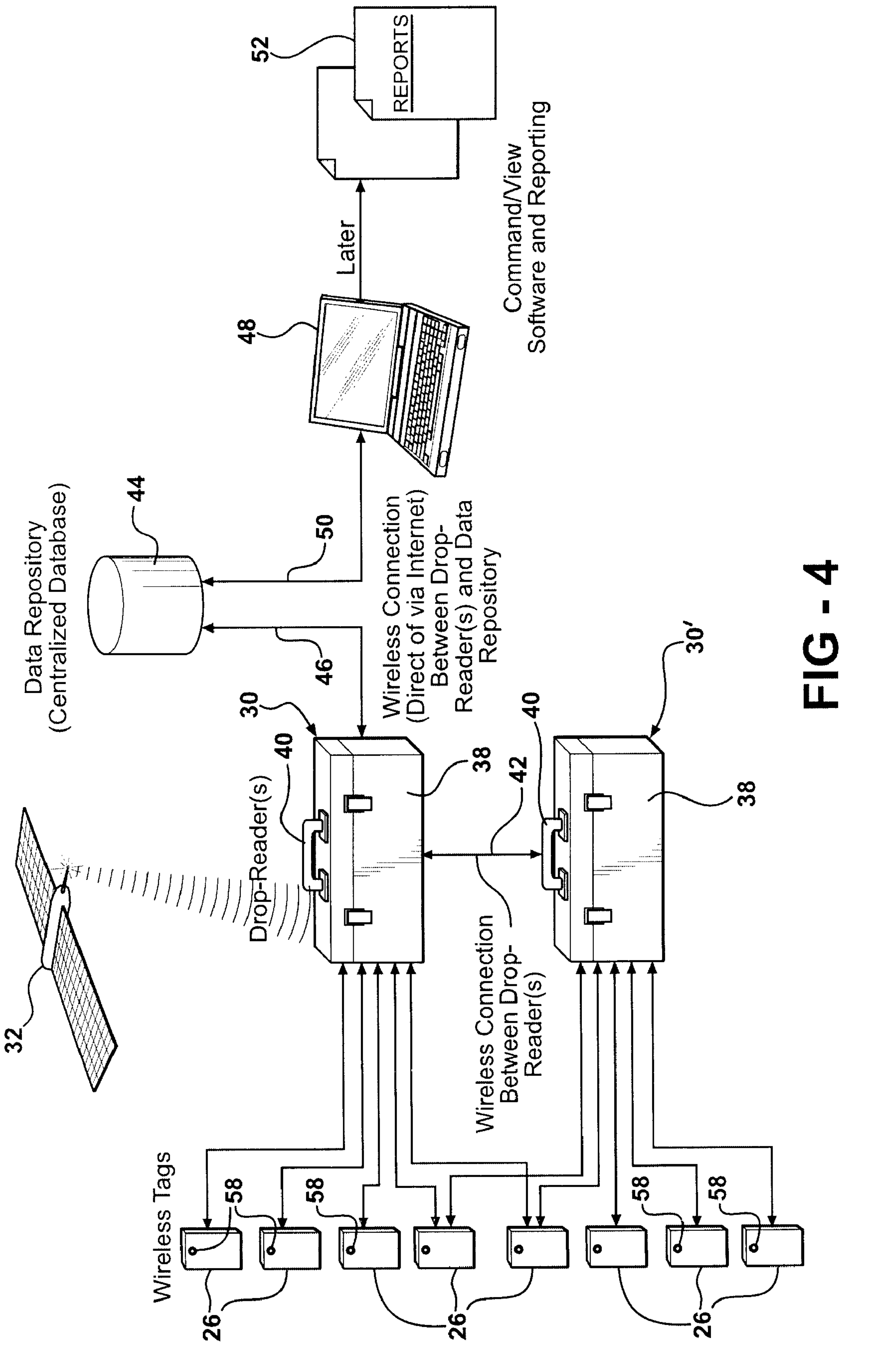
FIG. 4 is a schematic illustration of the subject tracking system.

The scene commander 18 possess a graphical user interface 48 such as a tablet PC, laptop computer, PDA or other device. The graphic user interface 48 communicates through a wireless connection 50 to the database 44 so that the specifying information which has been associated with the sensed ID numbers from the tags 26 can be transmitted from the central database 44. Preferably, although not necessarily, this information is superimposed over a map or other graphical representation of the scene. On the display, the scene commander 18 is able to locate and track every deployed resource 10-16. FIG. 4 is a schematic view illustrating the relationship between the several components in the subject tracking system. Data presented to the graphic user interface 48 for the benefit of the scene commander 18 can be exported as reports 52 for post event analysis and documentation.

Figure 5:
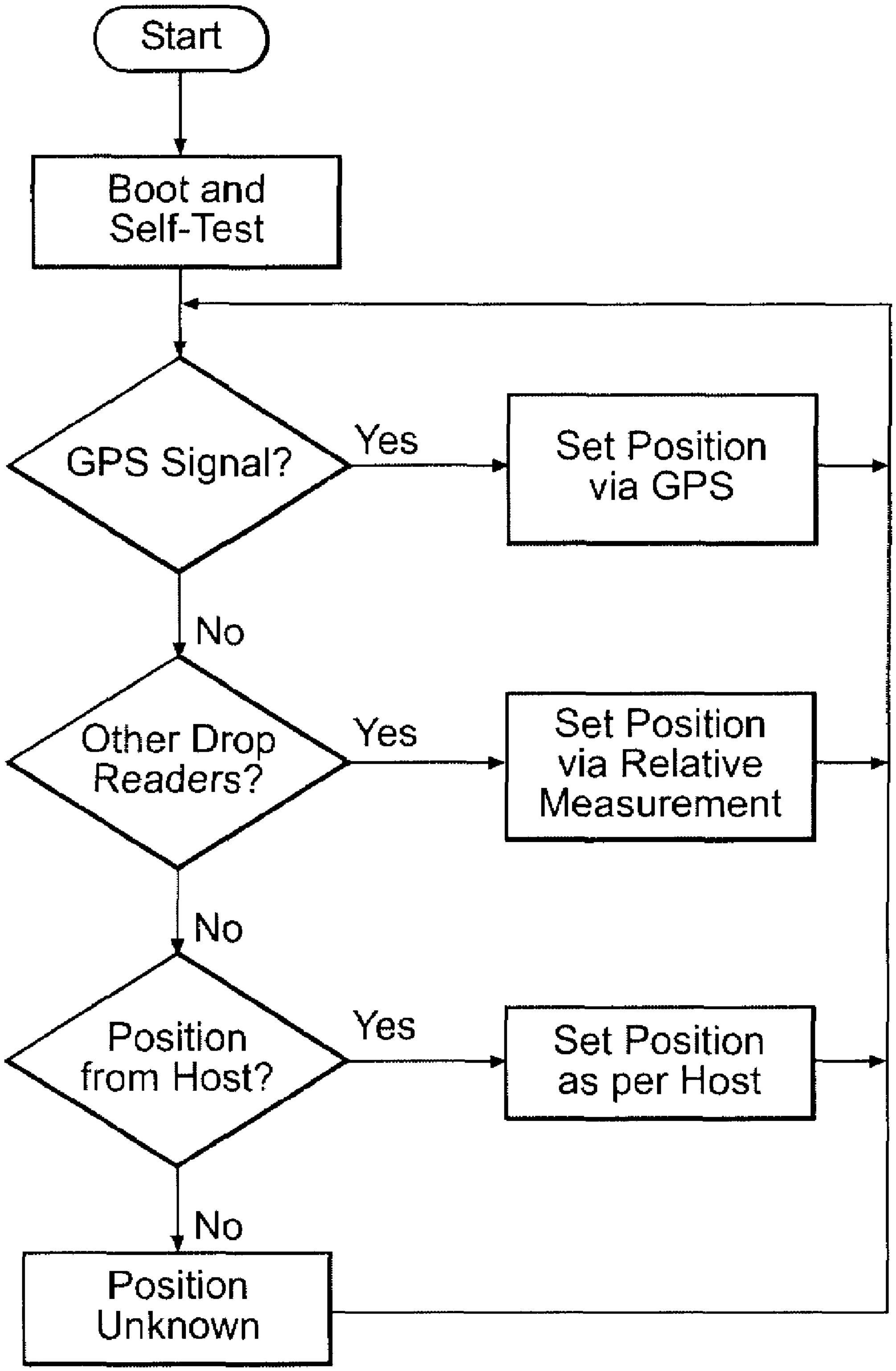
FIG. 5 is a simplified flow chart depicting an exemplary logic diagram of the auto-calibration and auto-positioning features of the drop readers.

FIG. 5 presents a flow chart schematically illustrating the logic sequence used to self-calibrate and position the various drop readers 30, 30'. As depicted here, each drop reader 30, 30' endeavors to establish a reliable GPS signal so that its absolute position can be assigned to it. If it cannot accurately establish its position through the GPS signal, the drop reader endeavors to establish its position relative to another drop reader, either a first drop reader 30 or another second drop reader 30'. By this method, its position is determined relative to other drop readers. Failing this, the drop reader will request that its host, e.g., the scene commander 18, assign it an absolute position upon the scene. This logic cycle is repeated endlessly for each drop reader 30, 30' throughout the duration of the chaotic event.

Figure 6:
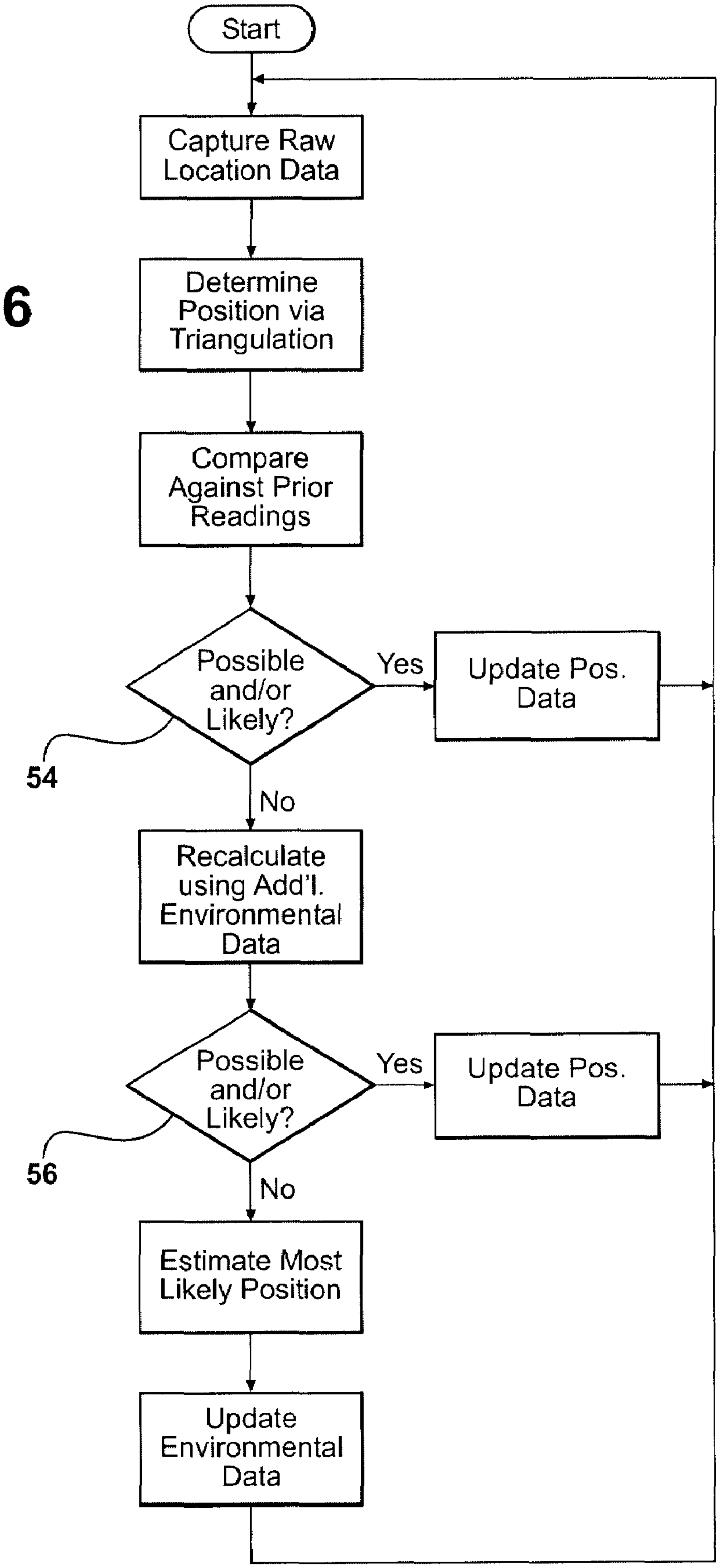
FIG. 6 is a simplified flow chart depicting an exemplary logic sequence for the use of non-traditional data to determine the location of a sensed tag.

FIG. 6 represents a schematic flow chart and logic diagram through which the drop readers 30, 30' accurately calculate the absolute position of sensed tags 26 in view of physical constraints. Such physical constraints may include information known about the operating space itself, such as obstructions and reflective surfaces, as well as data pertaining to the tagged resource 10-16. This latter aspect may include physical properties such as the last known mass, speed and direction of the tagged item. Thus, in referring to FIG. 6, it will be understood that the drop readers 30, 30' repeat the step of calculating the absolute position of sensed tags 26 at regular intervals. The shorter the repeat interval, the more accurate the information as to change of position and rate of change. For purposes of this example, it may be assumed that the cycle is repeated every few seconds. The control software is able to monitor the movement of each tag 26 over time through this procedure. However, because of the reality of physical constraints at the scene, the sensed data may not reliably resolve the absolute position of a tag at any given moment. For example, if the broadcast signal from a particular sensed tag 26 is passing through a heavy brick wall prior to its reception by a drop reader 30, and then the person or object to which the tag 26 is attached steps clear of the wall so that the signal strength rapidly increases, the control software used to determine the absolute position of the sensed tag 26 may interpret the quick change in signal strength as a rapid change in position. This not being the real case, the subject method compares each calculated change in position for a sensed tag 26 against predetermine physical constraints which may include obstructions, reflective surfaces and physical properties about the tagged item. In the preceding example, the predetermined physical constraint may be the knowledge that a 250 pound firefighter cannot traverse 100 feet in 2 seconds. The control logic then automatically adjusts the calculated absolute position of the sensed tag 26 relative to the scene whenever the predetermined physical constraint is violated.

Thus, and referring again to the exemplary logic presented in FIG. 6, decision block 54 queries whether a current reading, as compared against a prior reading, is possible and/or likely. If the question is answered in the affirmative, the reported position of the tag 26 to the graphic user interface 48 is updated. If the query is answered in the negative, the position of the tag 26 is recalculated using additional environmental data including whatever information can be known about the operating space itself and the tagged item. The recalculated position is then queried in function block 56 for reasonableness. If the recalculated position is plausible, its position is updated to the graphic user interface 48. If not, the software will estimate the most likely position for the tag 26 and then update the known environmental data which may include inferring an obstruction or reflective surface which is contributing to unreliable data.

Referring again to FIG. 3, the tag 26 is shown including a light source 58 affixed directly thereto. The light source 58 may be a light emitting diode (LED) or other suitable, low energy consumption device. The light source 58 is illuminated in response to the tag 26 moving either into or out of sensing range. Thus, by quick visual inspection, a firefighter 10 or other person can immediately determine whether a tag 26 is being tracked by the system. In the case of the light source 58 illuminating only when the tag 26 moves out of range, it serves as a warning, when lit, that the scene commander 18 is not aware of the location of the tagged item. In a converse example, where the light source 58 illuminates only when it is being sensed by a drop reader 30, 30', illumination of the light source 58 will indicate a safe condition. In this latter example, it may be advantageous to provide a green color to the light source 58. In the former example, where the light source 58 only illuminates when it moves out of range, it may be advantageous to color the light source 58 red. Of course, other combinations of colors and lighting schemes are possible. An important feature, however, is that the tag 26 can be visually inspected to determine whether it is or is not within read range of one of the drop readers 30, 30' at any given moment. In the preferred embodiment of this invention, the light source 58 maintains a generally constant intensity of emitted light regardless of fluctuations in the strength of the wireless readers signal. Thus, the light source 58 does not act as a signal strength meter, but rather as a "yes" or "no" indicator of participation in the tracking system.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for automatically calibrating a tracking system of the type used by emergency responders at the scene of a chaotic event, said method comprising the steps of: affixing a wireless tag to each of a plurality of emergency resources, each tag configured to broadcast a unique ID number via wireless signal; dispersing the resources together with their affixed tags about the scene of a chaotic event occurring over a generally defined area; placing a first drop reader device within the generally defined area of the scene; assigning the first drop reader an absolute position relative to the scene from a reference input external to the tracking system; receiving in the first drop reader at least one ID number from a sensed first one of the tags; locating the sensed first tag relative to the first drop reader; calculating the absolute position of the sensed first tag relative to the scene by relationship with the assigned absolute position of the first drop reader; placing a second drop reader device within the generally defined area of the scene and spaced from the first drop reader; receiving in the second drop reader at least one ID number from a sensed second one of the tags; locating the sensed second tag relative to the second drop reader; and locating the second drop reader relative to the first drop reader and then determining the absolute position of the second sensed tag relative to the scene by its relationship through wireless communication and calculation back to the first drop reader with the assigned absolute position of the first drop reader.

2. The method of claim 1 further including the step of transmitting the ID number of the sensed first tag to a central database.

3. The method of claim 2 further including the step of associating the ID number of the sensed first tag with prerecorded specifying information corresponding to the resource in the central database.

4. The method of claim 3 further including the step of transmitting the associated specifying information corresponding to the resource from the central database to a graphic user interface.

5. The method of claim 1 wherein said step of assigning the first drop reader an absolute position includes transmitting an absolute position from a navigational satellite.

6. The method of claim 1 wherein said step of assigning the first drop reader an absolute position includes manually setting an assumed location.

7. The method of claim 6 wherein said step of manually setting an assumed location occurs only if the first drop reader is unable to accurately determine its absolute position from a navigational satellite.

8. The method of claim 1 wherein said step of first orienting the second drop reader relative to the first drop reader occurs only if the second drop reader is unable to accurately determine its absolute position from a navigational satellite.

9. The method of claim 1 further including the step of encasing the second drop reader device within a box-like protective case.

10. The method of claim 1 further including the step of repeating at regular intervals said step of calculating the absolute position of the sensed tag to monitor movement of the tag over time; and comparing the change in position of the sensed tag over time to at least one predetermined physical constraint, and then automatically adjusting the calculated absolute position of the sensed tag relative to the scene when the predetermined physical constraint is violated.

* * * * *

UNITED STATES PATENT AND TRADEMARK OFFICE

CERTIFICATE OF CORRECTION

PATENT NO. : 7,633,387 B2
APPLICATION NO. : 11/563955
DATED : December 15, 2009
INVENTOR(S) : Dennis Conrad Carmichael et al.

It is certified that error appears in the above-identified patent and that said Letters Patent is hereby corrected as shown below:

Column 10, line 32: the word "step" should be changed to -- steps --.

Signed and Sealed this

Twenty-third Day of March, 2010

David J. Kappos

David J. Kappos
*Director of the United States Patent and Trademark Office*